United States Patent [19]
Horbach

[11] 3,932,085
[45] Jan. 13, 1976

[54] MOLD BASE

[76] Inventor: Stephen Horbach, 40 Glen Road, Mountain Lakes, N.J. 07046

[22] Filed: July 17, 1974

[21] Appl. No.: 489,428

[52] U.S. Cl............. 425/186; 425/195; 425/242 R; 425/406; 425/441; 425/444; 425/450.1
[51] Int. Cl.². ........................................ B28B 7/00
[58] Field of Search ......... 425/186, 195, 451, 182, 425/406, 168, 441, 242 R, 444, 450.1

[56] References Cited
UNITED STATES PATENTS

| | | | |
|---|---|---|---|
| 3,161,918 | 12/1964 | Zearbough..................... | 425/182 X |
| 3,724,802 | 4/1973 | Veneria ......................... | 425/242 X |
| 3,740,178 | 6/1973 | Neil .................................... | 425/182 |
| 3,838,960 | 10/1974 | Lovejoy .......................... | 425/242 R |

*Primary Examiner*—Robert L. Spicer, Jr.
*Attorney, Agent, or Firm*—Ryder, McAulay, Fields, Fisher & Goldstein

[57] ABSTRACT

A mold base employs tungsten carbide mold cavities. These hard, brittle cavities are supported by softer, more resilient and more malleable metal support elements. Cams and sliding surfaces are above the parting line and the base is opened from below the parting line.

28 Claims, 15 Drawing Figures

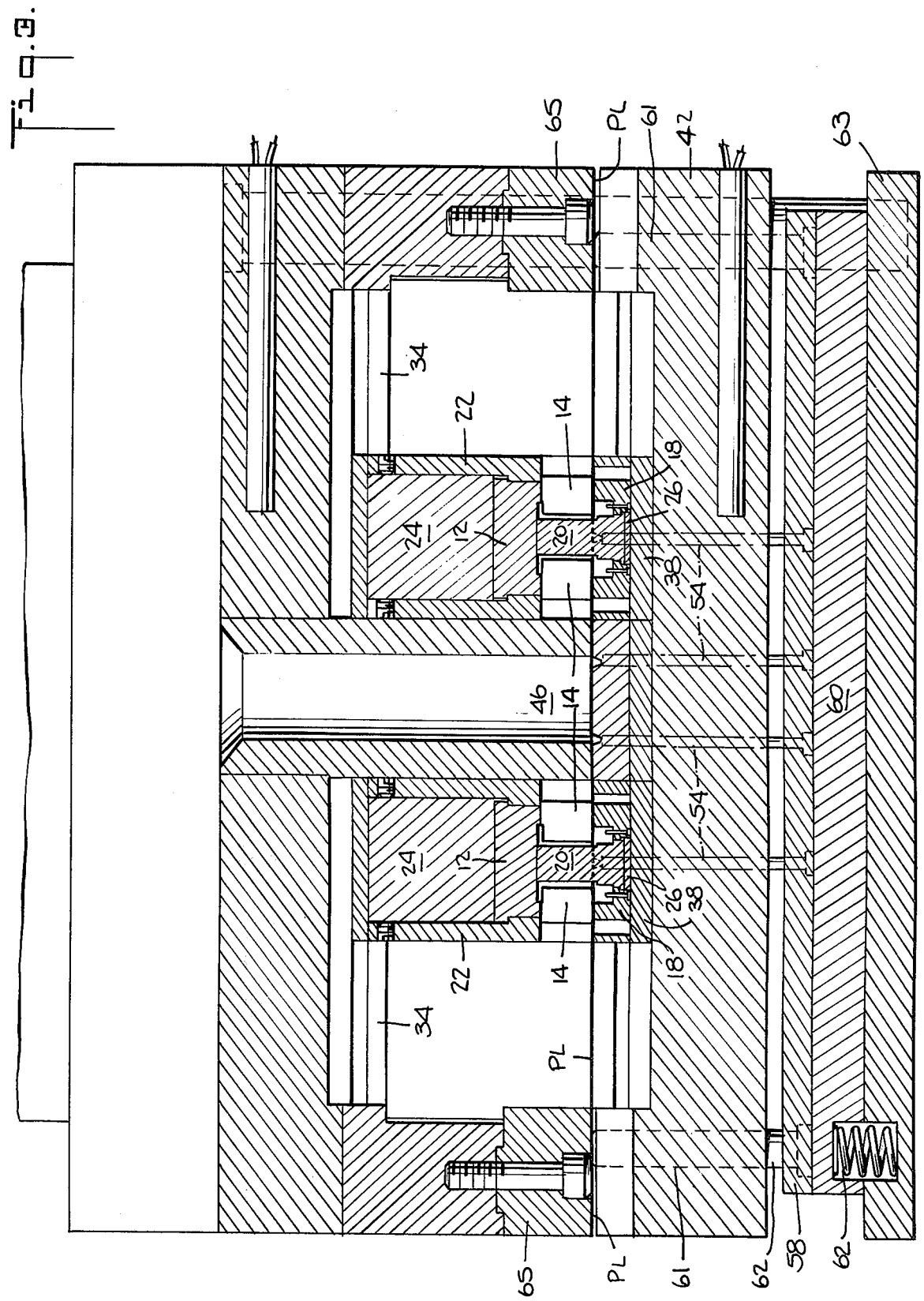

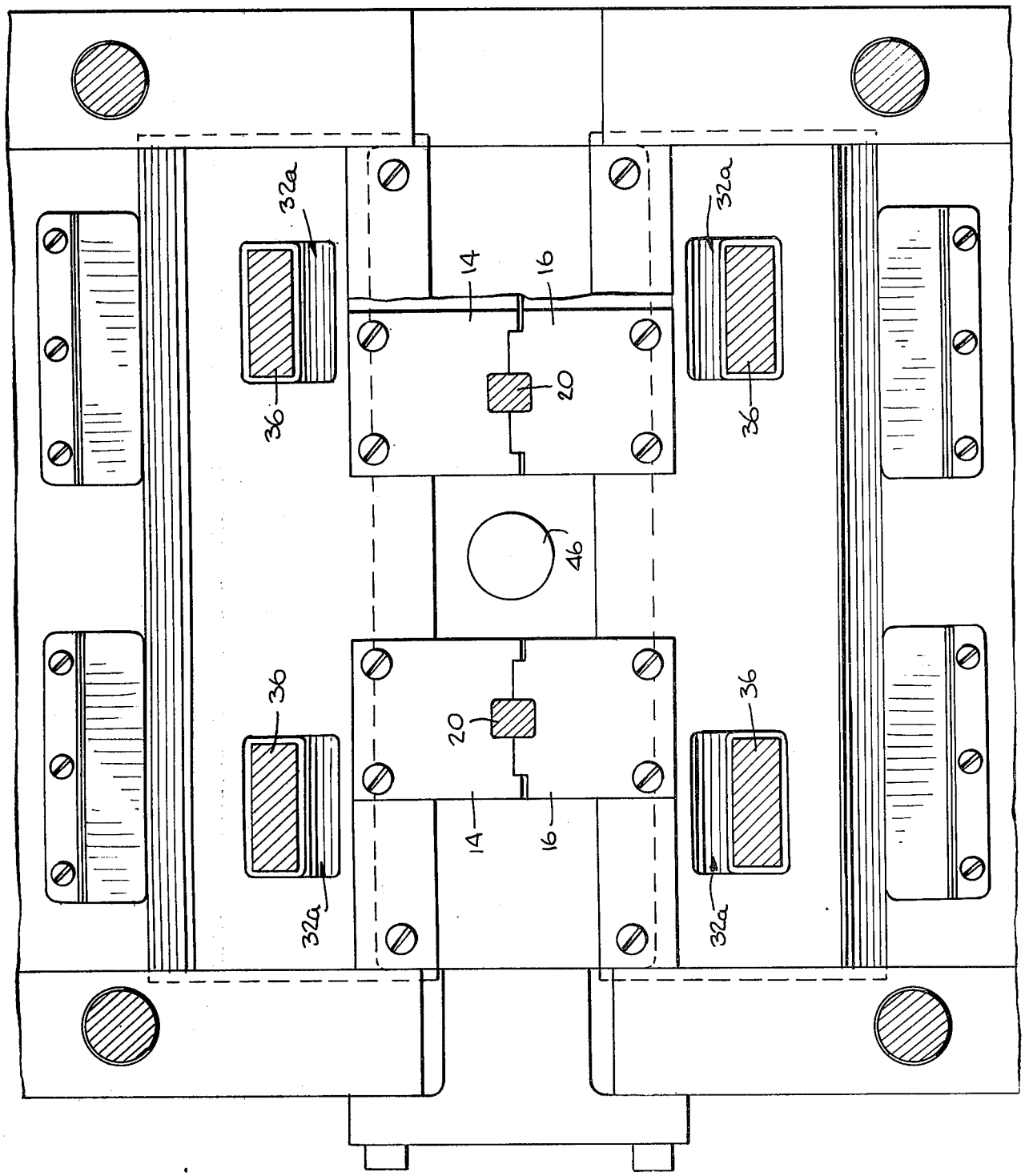

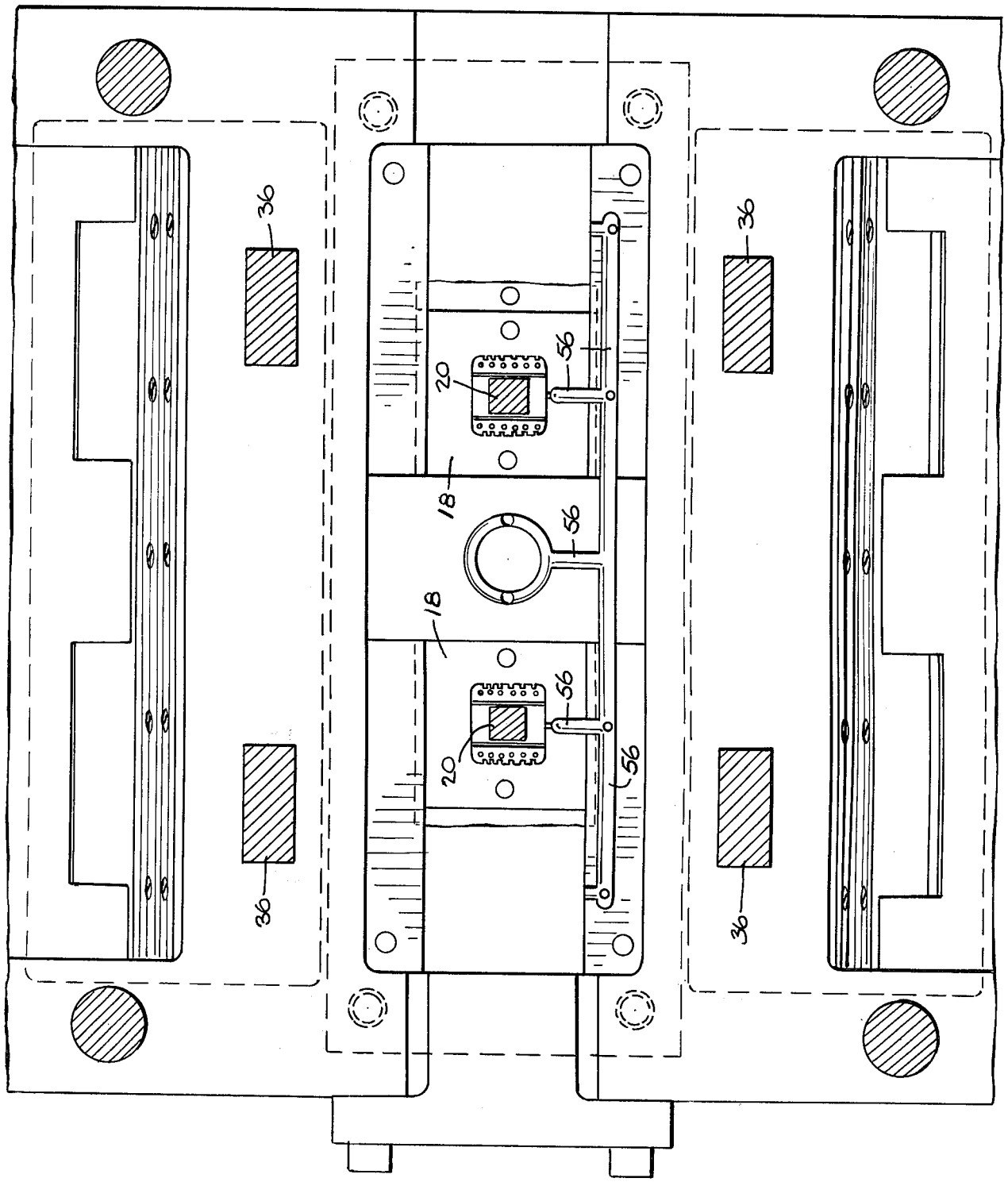

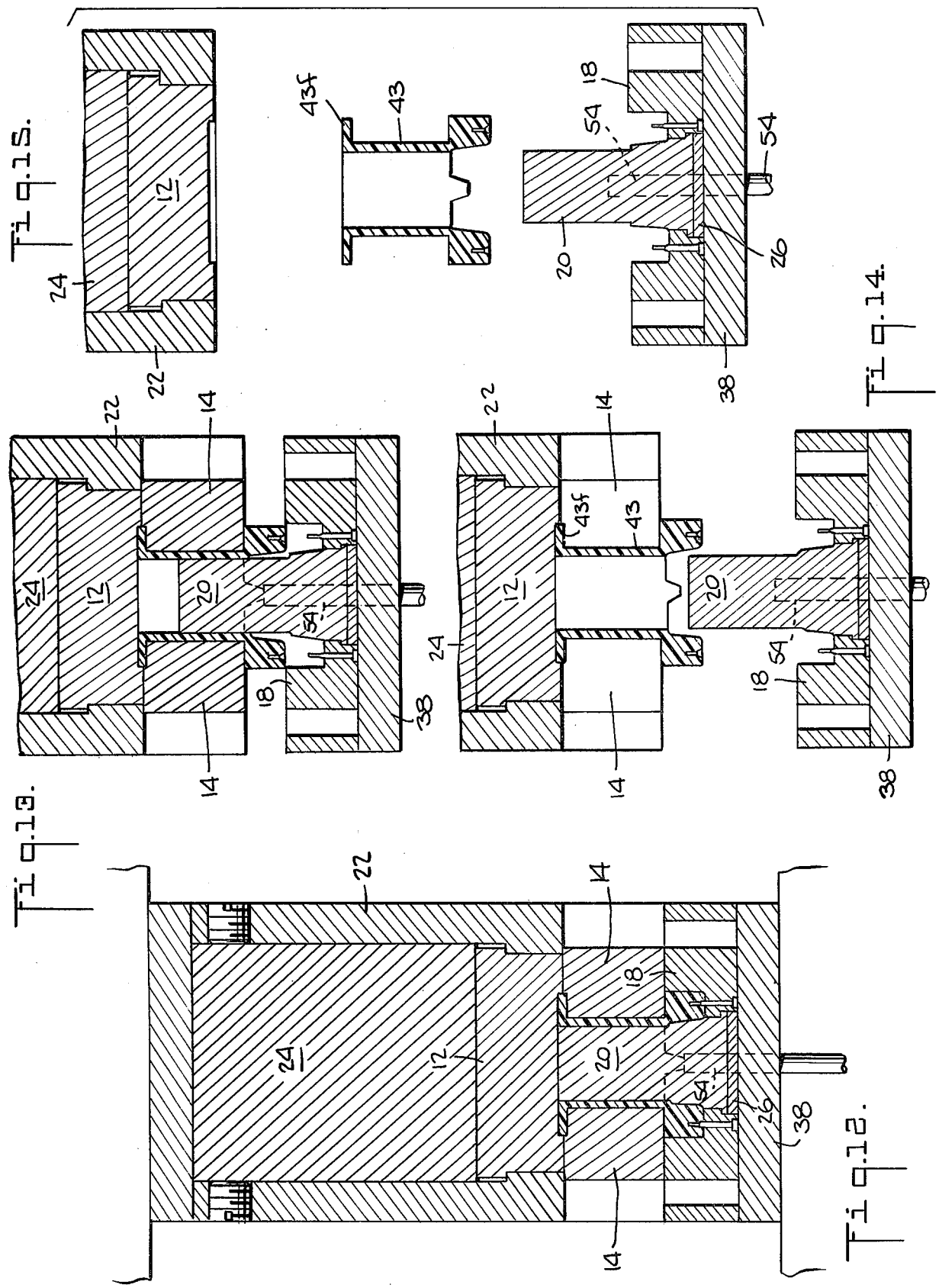

MOLD BASE

BACKGROUND OF THE INVENTION

This invention relates in general to mold bases for plastic molding materials and more particularly to a design which is adapted to employ tungsten carbide mold cavities thereby reducing the wear on the mold cavity when glass and asbestos fiber and particle filled molding materials are used.

The abrasiveness of many reinforced molding compounds, and in particular glass-fiber filled and asbestos-fiber filled molding compounds, creates a great deal of wear on the mold cavity pieces. This wear results in excessive and costly replacement of the cavity pieces and much equipment downtime.

Accordingly, it is a major purpose of this invention to provide a mold base design which will operate for extended periods of time without requiring replacement of the mold cavaties when abrasive molding materials are employed.

The material tungsten carbide is known to be a very wear-resistance material. It is extremely hard and can withstand the very high pressures to which mold cavity pieces are subjected. However, tungsten carbide is a very brittle material and as a practical matter, it cannot be used in most, if not all, known plastic mold bases because of its tendency to crack and shatter.

Accordingly, another purpose of this invention is to provide a mold design and base which can accommodate to the use of tungsten carbide mold cavity pieces with minimum risk of the tungsten carbide pieces cracking or shattering during use.

Consistent with the above purposes, it is a further purpose of this invention to provide a mold base which will minimize maintenance and repair problems.

BRIEF DESCRIPTION

In brief, this invention is a mold base which employs tungsten carbide mold cavity pieces. The mold cavity pieces are supported or surrounded in the mold base by softer metals, such as soft steel, invar and brass. Certain of these soft metal units are arranged to absorb the mechanical energy and shock upon closing of the mold. Other of these metals are arranged so as to give sufficiently to compensate for slight degrees of misalignment between the tungsten carbide mold cavity pieces.

In addition, the supports for the tungsten carbide mold cavity pieces have a greater coefficient of thermal expansion than does tungsten carbide so that during the molding process any expansion of the mold cavity pieces and the mold base will tend to relieve rather than tend to increase the twisting or bending strains on the tungsten carbide cavity pieces.

Further, in those embodiments where portions of the mold cavity have to be cammed in and out during closing and opening of the mold, the camming action and surface sliding which has to occur is designed to be above the parting line. Thus particles of flash and runners will not fall into this working mechanism. The result is a plastic mold base which is easier to clean, requires less maintenance and, more importantly, minimizes the risk that these flash and runner particles will cause mold cavities to break or will cause misalignment that will result in straining the tungsten carbide mold cavity pieces to the point where they will crack.

Other features and details of this invention are described in the detailed description set forth below.

THE DRAWINGS

FIG. 1 is an exploded view of the tungsten carbide mold cavity units and certain softer support elements in one embodiment of this invention. The embodiment shown herein is designed for the molding of bobbins having upper and lower flanges.

FIG. 2 is a vertical cross sectional view through a mold base showing the FIG. 1 mold cavity units in cross section. In FIG. 2, the mold base is shown fully closed. The complex parting line PL is shown as a heavy line.

FIG. 3 is a cross sectional view along the line 3–3 of FIG. 2 illustrating two mold cavities in a single mold base.

FIGS. 4 and 5 are cross sectional views along the complex parting line labelled P.L. FIG. 4 is a view looking up and thus shows the bottom of that portion of the mold cavity and mold base that is above the parting line.

FIG. 5 is a view looking down and thus shows the top of that portion of the mold cavity and mold base that is below the parting line.

FIG. 6 is a plan view of the lower mold cavity unit (which is the unit below the parting line) showing the provision made for the terminal holes and wire lead slots that are present in the lower flange of the molded bobbin.

FIGS. 7–11 are a view along the same cross-section of that of FIG. 2 except on a larger scale showing primarily the mold cavity and other units shown in FIG. 1.

FIG. 7 shows the mold completely closed with the bobbin molded in place.

FIG. 8 shows an early stage in the opening of the mold in which the portion of the mold base below the parting line is being retracted downwardly. FIG. 8 illustrates the support-ejector pins which extend up from the bottom of the mold base to hold the runners and thus the bobbin in place while hardening on exposure to air occurs.

FIG. 9 shows a further stage in the opening of the mold in which the support-ejector pins have been retracted and the core piece has moved down to a point where it clears the bobbin.

FIG. 10 shows the next stage in the opening of the mold in which the two side cavity pieces are operated or cammed outwardly so that the bobbin is no longer being held in place and is free to drop.

FIG. 11 shows the bobbin and associated runner dropping free of the upper cavity unit.

FIGS. 12–15, like FIGS. 7–11, illustrate the opening of the mold after a bobbin has been molded. However, FIGS. 11–15 represent a cross section similar to that of FIG. 3, except on a larger scale showing primarily the mold cavity units and other units shown in FIG. 1.

FIG. 12 shows the mold closed with the bobbin molded in place.

Figure 8:
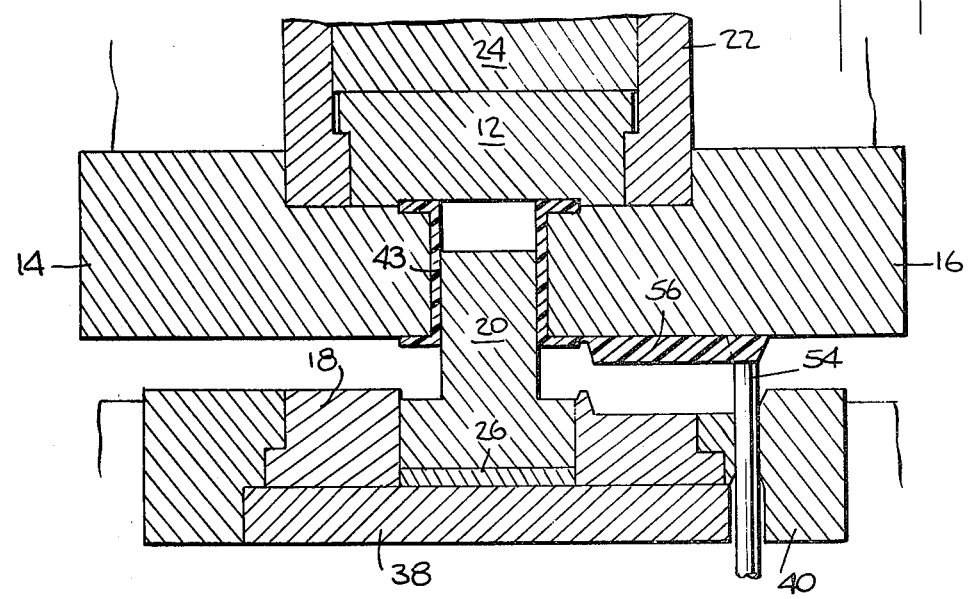

FIG. 13 illustrates an early stage in the opening of the mold and is the stage also shown in FIG. 8.

Figure 9:
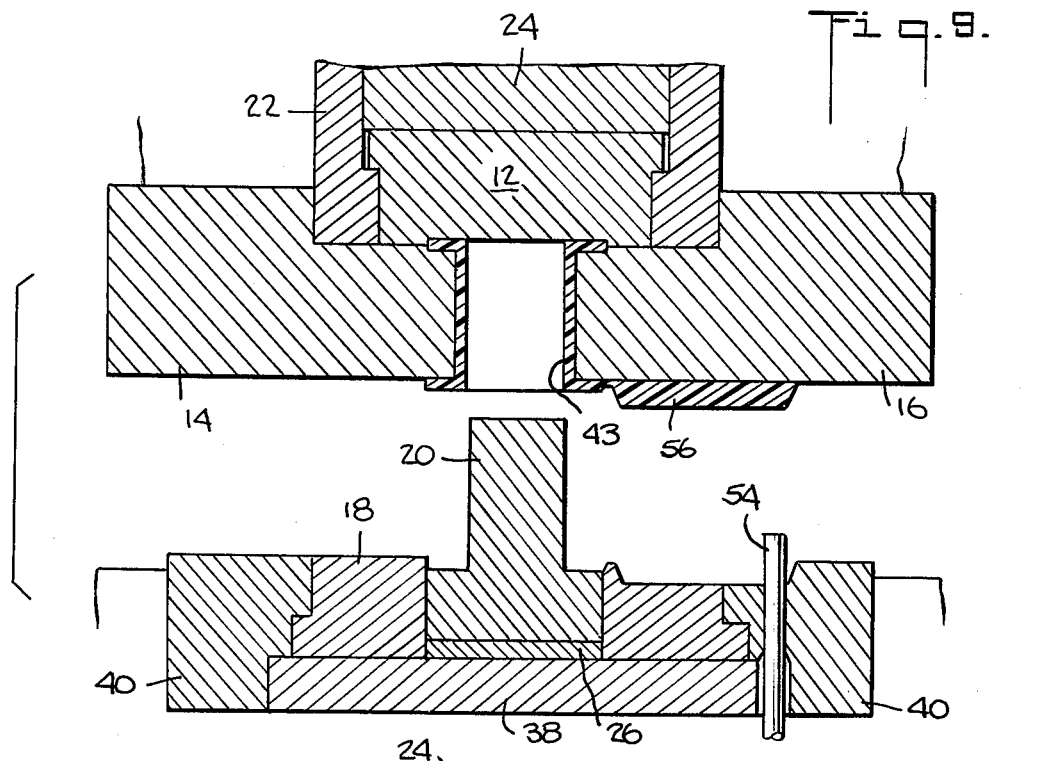

FIG. 14 illustrates a further stage in the opening of the mold and is the stage also shown in FIG. 9.

Figure 11:
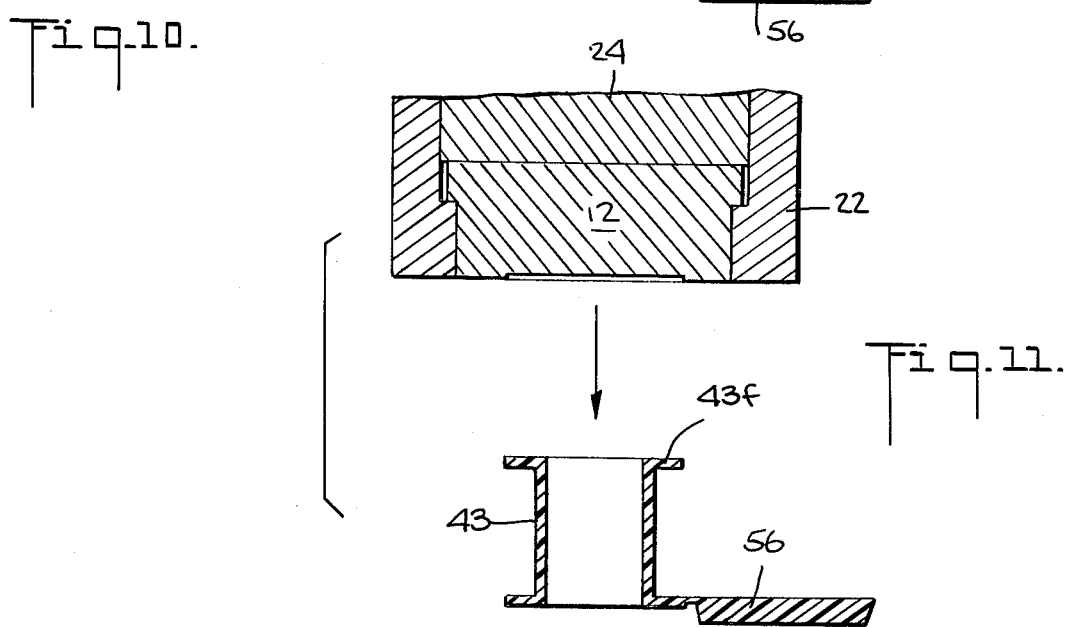

FIG. 15 illustrates the full opening of the mold in which the bobbin, runners and cull are released from the top cavity unit and thus fall free. FIG. 15 shows the same opening stage as is illustrated in FIG. 11.

DESCRIPTION OF THE PREFERRED EMBODIMENTS

Figure 1:
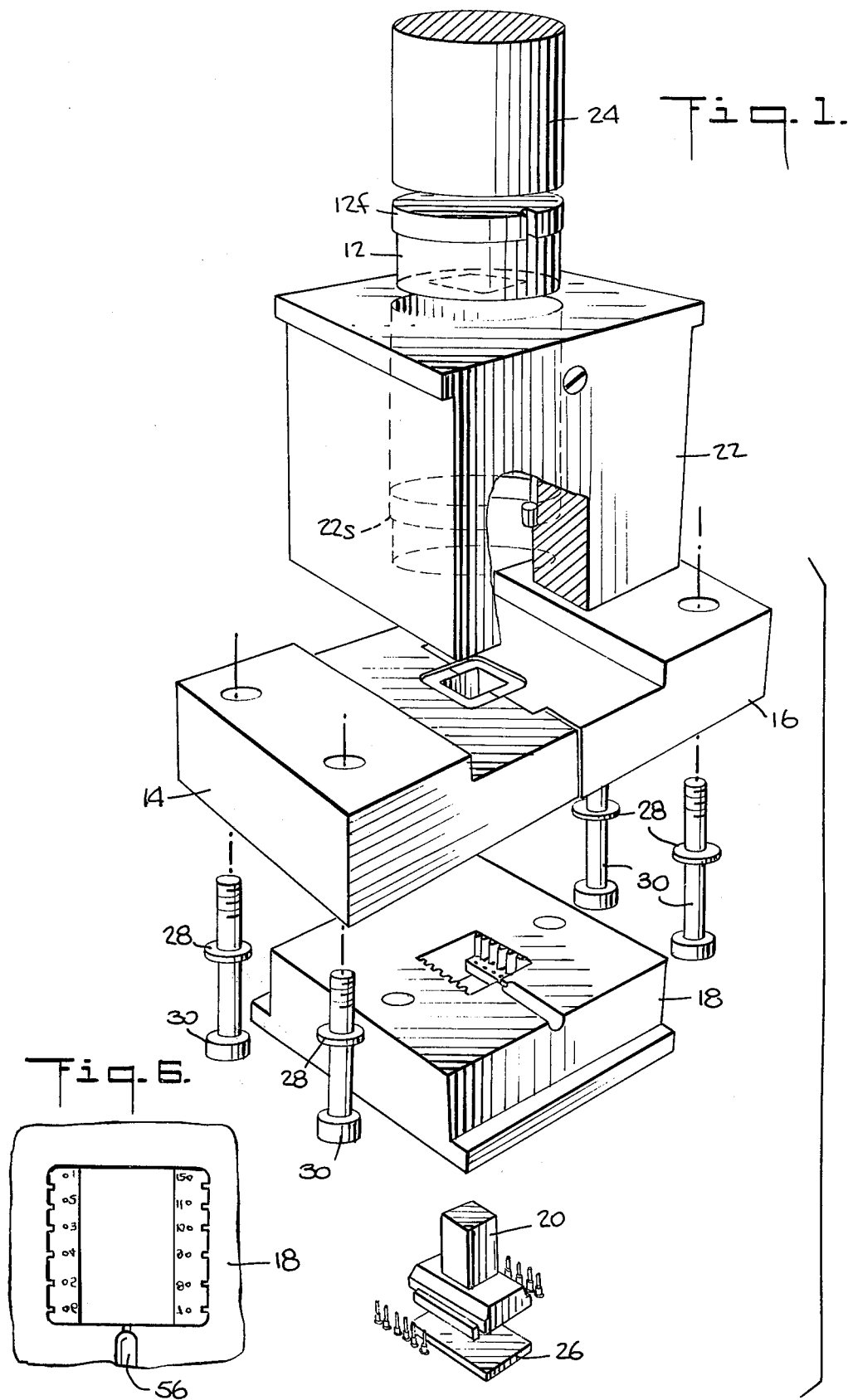
Figure 2:
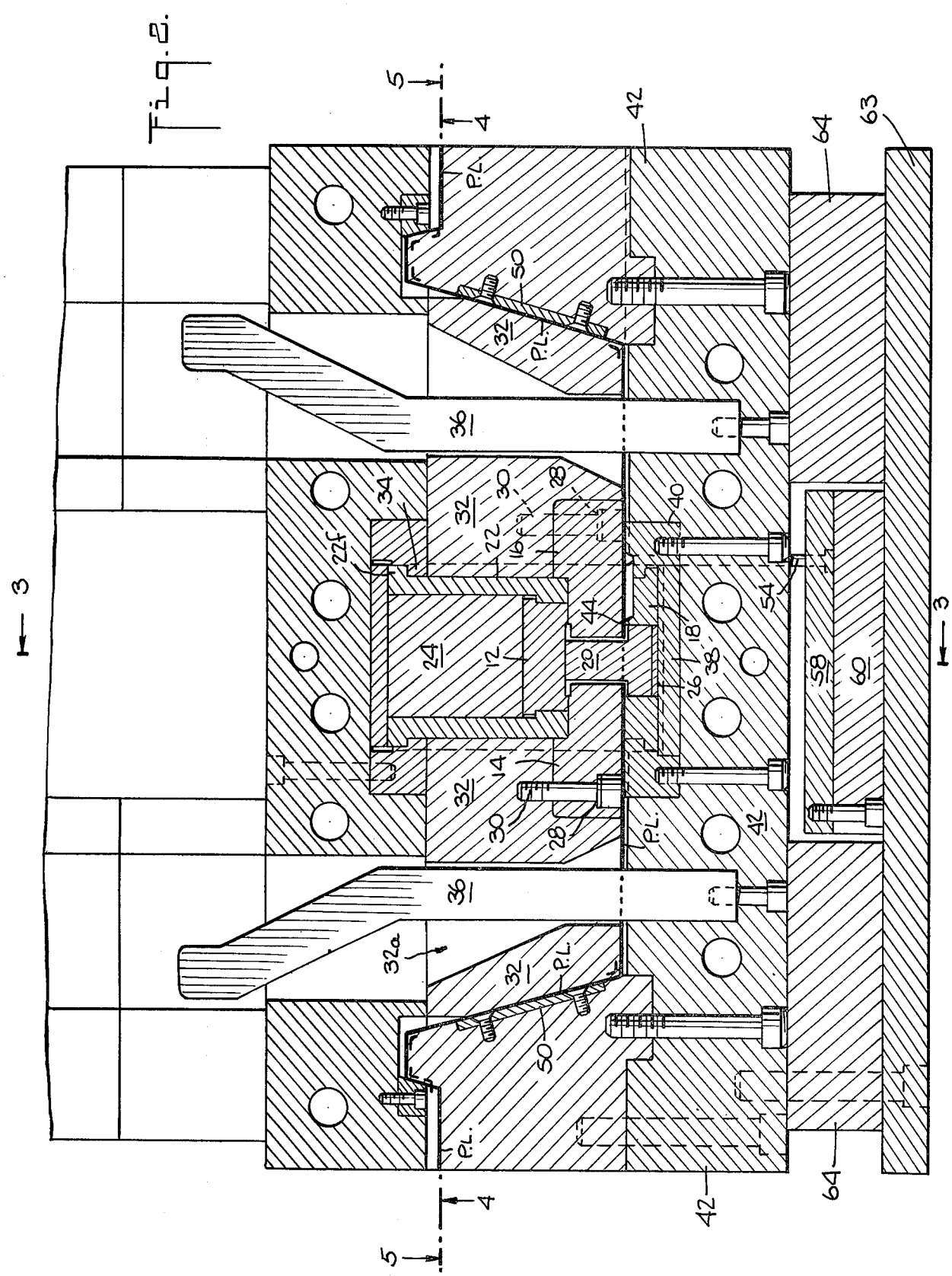

In the embodiment shown, the invention is adapted to be used for molding bobbins. In such an embodiment, the cavity for the bobbin is defined by four cavity mold pieces and a core piece. The core piece is frequently called a core pin. As best seen in FIG. 1, these five cavity pieces are an upper cavity piece 12, two side cavity pieces 14, 16, a bottom cavity piece 18 and the core piece 20. The relationship between these units when the mold is closed is shown in FIGS. 2 and 3. In FIGS. 2 and 3 the parting line PL is shown as a heavy line.

The upper cavity piece 12 is positioned within a retainer unit 22. There is a slip fit relationship between the walls of the cylinderical upper cavity piece 12 and the lower portion of the inner walls of the retainer unit 22. An outwardly extending flange 12f of the upper cavity piece 12 rests on a shoulder 22s within the central opening of the retainer 22 to determine the vertical position of the upper cavity piece 12.

The material out of which these cavity pieces 12, 14, 16, 18 and 20 are made is tungsten carbide. Tungsten carbide is a hard but brittle material which is used herein because it provides exceptional resistance to wear. This resistance to wear is particularly important where the plastic molding material is abrasive. Glass and asbestos particle and fiber filled material are among the more abrasive molding materials and their use results in substantial mold cavity wear requiring replacement and down time.

The tungsten carbide material is extremely brittle. It is about as brittle as fine porcelain. The mechanical energy transmitted to the cavity pieces on closing the mold can provide a mechanical shock which will shatter or crack the tungsten carbide mold cavity pieces 12, 14, 16, 18, 20.

In addition, any slight misalignment between mold cavity pieces can result in a twist or bend to the material, as the mold completes its closing, which will crack this brittle tungsten carbide materials.

Furthermore, the expansion of the materials in the mold base on heating during use tends to create mechanical strains which can result in cracking a material as brittle as tungsten carbide.

The tungsten carbide material can stand substantial compressive forces as long as there is no twist or torsion applied to the material.

This invention provides a mold base in which the risk of having the tungsten carbide material crack or shattered is minimized.

Among the elements of the mold base which protect against the tungsten carbide shattering are the relatively soft steel plug 24 which backs up the upper cavity piece 12 and the relatively soft steel back-up plate 26 and base plate 38 which support, respectively, the tungsten carbide core 20 and lower cavity piece 18. In addition four brass (or invar) washers 28 provide the bearing contact between the tungsten carbide side cavity pieces 14, 16 and the cam follower blocks 32 (see FIG. 2). Two bolts 30 and two washers 28 hold side cavity 14 to a first cam follower block 32. Two bolts 30 and two washers 28 hold side cavity 16 to a second cam follower block 32.

The lower cavity piece 18 has a central opening into which the core piece 20 and its soft steel back-up plate 26 sit. The lower cavity piece 18 is positioned by a retainer unit 40, which unit 40 is bolted to the frame (see FIG. 2). The bottom cavity piece 18 and back-up plate 26 rest on the soft steel base plate 38.

The core 20 and its back-up plate 26 have a length that is approximately 1 mill (0.001 inches) greater than the distance, when the mold is closed, between the tungsten carbide upper cavity 12 and the base plate 38. Thus, on closing, the initial contact between tungsten carbide cavity pieces is between the upper cavity 12 and the core 20. The energy of this mechanical closing is, in large part, absorbed and dissipated by the large volume relatively soft steel back-up plug 24 and plates 26, 38. In one embodiment, the plug 24 is 2.5 inches long and has a 2.0 inch diameter while the plate 38 is about 0.5 inches thick. Accordingly, the shock on mold closing is not borne by the fragile tungsten carbide cavity pieces and the cracking or shattering of these pieces, which might otherwise occur, is substantially eliminated.

This one mill oversize dimension for the core 20 and its back-up plate 26 is further desirable to reduce the risk of flash-over across the central opening of the bobbin being molded.

The soft steel bakc-up plug 24, soft steel base plates 26 and 38 are, in one embodiment, an 8620 steel which is case hardened between 1/32 to 1/16 of an inch to Rockwell hardness of C-56-58. Thus these energy absorbing elements 24, 26 and 38 have a soft steel core to absorb energy during the shock of closing the mold yet have a thin hard shell to resist corrosion and surface damage during handling. The back-up plug 24 is large in volume to provide an appreciable energy sink for absorbing the energy of impact. Most of the other steel units, including the four bolts 30 and the retaining units 22, 32, are a fully hardened or deep hardened steel having a Rockwell hardness of approximately C-55-56 and thus are about as hard as the shell of the soft steel units 24, 26 and 38. Such hardness is substantially less than the hardness of the tungsten carbide cavity pieces. The tungsten carbide employed is a No. CD60, WC grade having a Rockwell hardness of A80–83. The base plate 26 may be ¼ of an inch thick with a 1/32 inch skin or may be made of invar or brass.

In addition to this problem of absorbing the shock of closing, there is the problem of compensating for misalignment between the tungsten carbide cavity pieces. In large part, the four brass washers 28, which are relatively malleable, provide the give and adjustment necessary to take up slight degrees of misalignment. It is still important that the mold base be designed to close with as much parallelism and flush contact as possible between the various tungsten carbide cavity pieces. However, if there is, as there inevitably will be, some slight misalignment, the side cavity unit 14 and 16 can compensate slightly through give of the four brass washers 28 to prevent cracking of the tungsten carbide cavity units.

During molding, the mold base is raised to a temperature of between 400°F and 500°F. The mold cavity pieces and retainer units expand. If the tungsten carbide cavity pieces were to expand more than the retainer units, any strain due to misalignment will be increased thereby increasing the risk of cracking. The tool steel retaining elements 22, 32 and support elements 24, 26, 28 and 38 are selected to have a coefficient of thermal expansion greater than that of tungsten carbide. As a consequence the differential expansion between the fracturable tungsten carbide and the surrounding units will tend to relieve rather than enhance strain on the tungsten carbide cavity pieces.

With the above understanding of the elements and arrangement of the mold cavity pieces, the structure and operation of the mold base shown in FIGS. 2–5 can be readily understood. In connection with the following description it is important to keep in mind the location of the somewhat complex parting line (PL) shown in FIGS. 2 and 3. This complex parting line arises out of a design in which certain moving parts (the side cavity pieces 14, 16, and cam blocks 32) are positioned above the parting line. The purpose for such an arrangement is to make sure that particles of molding material, such as flash, runners, parts, pieces of runner and other detritus fall free by gravity and not on the surfaces on which these moving parts ride, thereby making the mold base design of this invention substantially easier to keep clean and eliminating a source of breakage and warping. This "upside-down" feature in which parts that are normally below the parting line are above the parting line is one of the factors that reduces the risk of misalignment between tungsten carbide mold cavity pieces when the mold is closed and thus reduces the risk of breaking these brittle tungsten carbide parts.

The upper cavity unit 12 together with its retainer 22 and soft steel plug 24 are held in position by the engagement between an outwardly extending flange 22f at the top of the retainer 22 and rails 34 in the mold frame.

Each side cavity unit 14 and 16 is bolted to a separate cam follower block 32. Each of the cam follower blocks 32 has an opening 32a through which a cam 36 passes. The cam 36 is called a dog-legged cam herein because of the cam's configuration (best seen in FIG. 2). In operation, as will be described in greater detail below, when the mold opens the cam follower blocks 32 ride on the surfaces of the dog-legged cams 36 to pull the side cavity pieces 14, 16 outwardly.

The bottom cavity unit 18 rests on the soft steel base plate 38 as does the soft steel back-up plate 26. The bottom cavity unit 18 is positioned within a retaining unit 40, which retaining unit 40 in turn is bolted to the main block 42 below the parting line P.L.

FIG. 3 illustrates two mold cavity assemblies showing a single assembly on each side of the transfer pot 46. In operation, dummy units would be added outboard of the two cavity assemblies shown in order to position these assemblies and to prevent material from running out the ends of the runners 56 as well as to hold the inside cavities in position while molding. As can best be seen in FIGS. 3 and 5 the lower flange of the bobbin 43 is molded below the parting line. The gate 44 (see FIG. 2) is at the parting line while the runners 56 are below the parting line.

Wear plates 50 permit compensation for wear in the mold cavity and retainer units. If there is wear after a period of time, shims of one or two mills thickness can be inserted under the wear plates 50 to bring the upper surface of the wear plates inboard so as to assure centering of the side cavity pieces 14, 16 and the retainer unit 22 which in turn centers the top cavity piece 12.

In operation, the mold base below the parting line is pulled downward by hydraulicly operated press platens (not shown) connected to hydraulic cylinders (not shown). During the initial stages of retraction of the main unit 42 below the parting line, a set of support-ejector pins 54 continue in position and remain in contact with the runners 56. Although the molding material has been allowed to set for a period of perhaps three minutes before the mold is opened and thus the catalytic reaction has substantially taken place, there is a certain softness in the resin-rich surface of the molded material that provides a rubber-like consistency initially. However, the first exposure to air of the runners 56 and the rest of the bobbin 43 tends to immediately harden this surface. By supporting the runners 56 and thus the bobbin 43 with the pins 54 for about one second during the initial opening of the mold, enough time is allowed so that the air will contact and harden the surfaces of the molding material before support is withdrawn from the molding material. In this fashion, the risk of having the runners break free and perhaps damage the base flange of the molded bobbin is minimized.

As may best be seen in FIGS. 2 and 3, the support-ejector pins 54 extend up through the unit 42 so that as the unit 42 is retracted downward the pins 54 remain in position to provide the desired support for the runners 56. FIGS. 2 and 3 illustrate the mold base in the closed condition. The support-ejector pins 54 have the vertical position shown when the mold is closed because the heads of the pins 54 are held between the two plates 58 and 60. Thus, the position of plates 58 and 60 will determine the position of the support-ejector pins 54. The position of the plates 58 and 60 in turn, is controlled by the joint action of four return pins 61 (two are shown) and of four springs 62 (one is shown). In the closed condition shown, the return pins 61 force the plates 58 and 60 to a downward position so that the plate 60 contacts plate 63 and thus the springs 62 are compressed. Thus, as shown, there is a space (⅜ of an inch in one embodiment) between the plate 58 and the lower surface of the main lower block 42. As the mold opens the block 42 together with the units 64 and the plate 63 (all of which are bolted together) retract downward. However, plates 58 and 60 together with support-ejector pins 54 are biased upward by the springs 62 thereby maintaining the pins 54 in the protracted position shown in FIG. 8. After ⅜ of an inch of travel, the unit 42 contacts the plate 58 and thereafter carries the plates 58, 60 downward. Thus only after ⅜ of an inch of mold base opening do support-ejector pins 54 start to retract away from the runners 56. This relationship between pins 54 and runners 56 is shown in FIGS. 8, 9, 13 and 14.

On closing the mold, upward travel of the plate 63 carries the plates 58, 60 and pins 54 to the point where the return pins 61 contact the units 65 in the upper half of the mold base. Once the return pins 61 have contacted the unit 65, those pins 61 can travel no further up. These return pins 61 are attached to the plates 58 and 60 and thus further closing of the mold forces plate 58 and 60 downward to compress the springs 62 until the plate 60 contacts the plate 63 as shown in FIGS. 2 and 3.

The cams 36, which are referred to herein as dog-legged cams because of the shape shown in FIG. 2 are mounted in the base unit 42 and thus retract downwardly as the base unit 42 retracts downwardly. After the base unit 42 has retracted about 1 ½ inches, the surface 36s of the dog-legged cam 36 contacts the interior surface 32s of the cam follower unit 32. Further travel of the dog-legged cam 36 downward pulls the cam follower block 32 in an outboard direction, thereby carrying the side of the cavity units 14, 16 outwardly to the position shown in FIG. 10.

Figure 7:
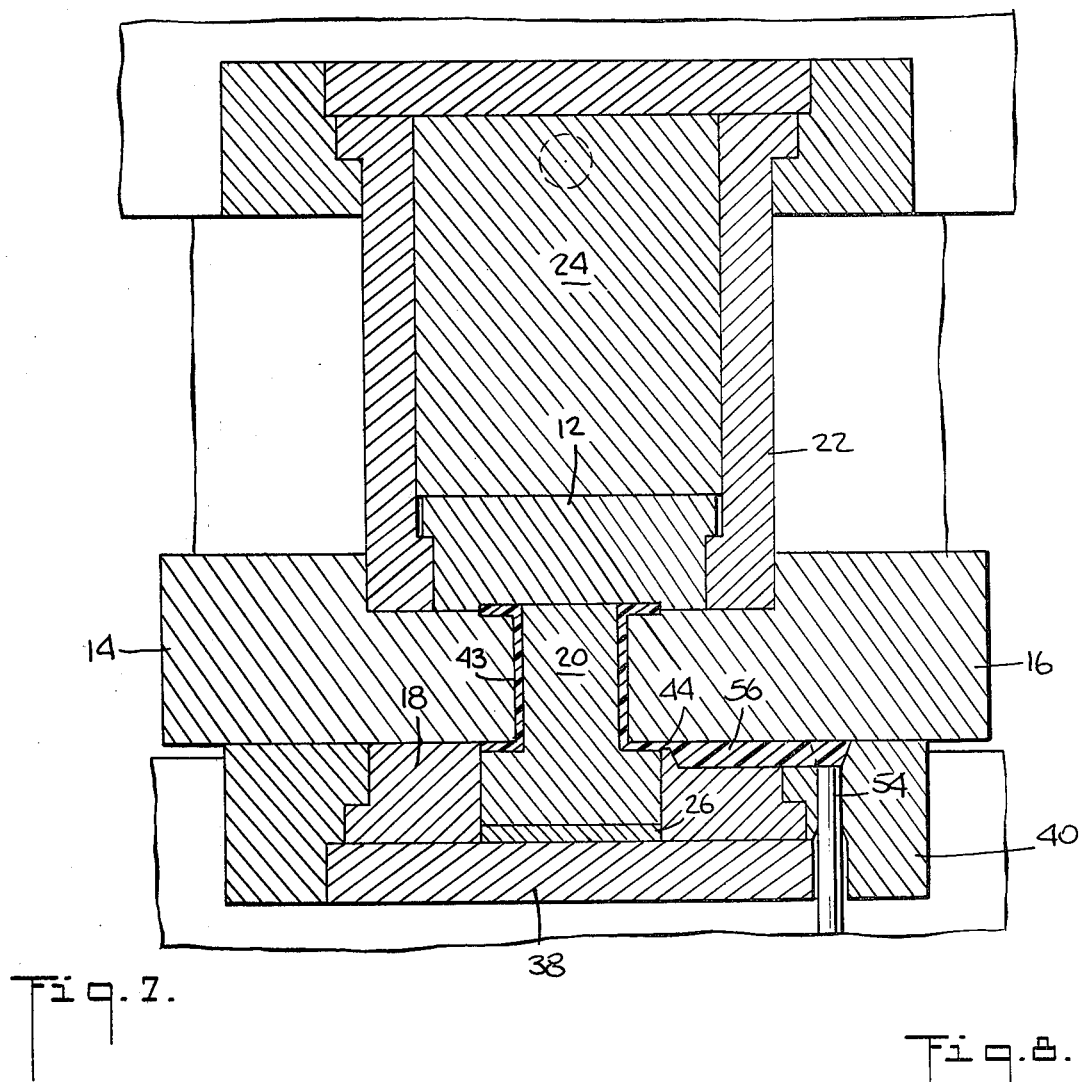
FIGS. 7–11 illustrates the opening up of the mold after the bobbin has been molded.
Figure 10:
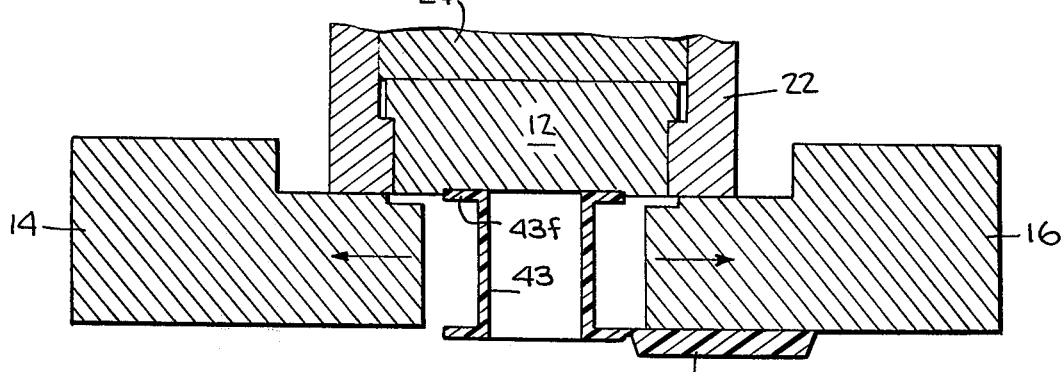

As may best be seen in FIGS. 2, 7 and 8, the portion of the mold cavity that forms the upper flange 43f of the bobbin 43 is formed in part by a recess area in the upper cavity 12 and in part by the side cavities 14, 16. This setting of the upper flange 43f partially into the upper die piece 12 is important so that during opening of the mold, when the side cavities 14, 16 move outwardly, there will be no risk that the bobbin 43 will travel with one or the other side cavities 14, 16. The seating of the upper flange 43f into the shallow recess in the upper cavity 12 tends to hold the bobbin 43 centered during the opening of the mold and aids in preventing twisting, racking or travel of the bobbin during the opening process. This assures that the bobbin 43 will be positioned as shown in FIG. 10 at that stage in opening of the mold. This is particularly important because there may be adhesion between the surface of one of the moving side cavities 14, 16 and the molded surface of the bobbin 43. The support pins 54 aid somewhat in making sure that this seating of the upper flange 43f in the upper cavity 12 is maintained until the side cavities 14, 16 have broken free of the bobbin. Because of this arrangement, there is no need for knock out pins to separate the bobbin 62 from the side cavities 14, 16.

What is claimed is:

1. In a mold base, the improvement adapting said mold base for long life use with abrasive molding material comprising:
    a frame,
    at least two tungsten carbide mold cavity pieces, at least a first one of said mold cavity pieces being above a parting line and at least a second one of said mold cavity pieces being below a parting line, said mold cavity pieces having surfaces in contact with one another when the mold base is closed,
    a plurality of support elements supporting said mold cavity pieces within said frame,
    said support elements comprising a material substantially softer than tungsten carbide, said support elements being the sole force transmitting elements in contact with said mold cavity pieces,
    a first set of said support elements receiving the energy of impact on closing the mold to absorb and dissipate said energy, said first set of said support elements having substantial resilliency,
    a second set of said support elements having substantial malleability, said second set of said support elements mechanically giving on closing the mold to provide alignment of said contacting surfaces of said tungsten carbide mold cavity pieces with one another.

2. The improvement of claim 1 adapted for the molding of an article, such as a bobbin, having at least one upper flange, further comprising:
    said mold cavity pieces including first and second side cavity pieces, said side cavity pieces being movable between an inboard position and an outboard position,
    a cam and cam follower pair coupled to said side cavity pieces to move said side cavity pieces between said inboard and outboard positions as the mold closes and opens respectively,
    said first and second side cavity pieces and said cam and cam follower pair all being above said parting line.

3. The improvement of claim 1 adapted for the molding of an article having a through-opening requiring a core piece further comprising:
    a tungsten carbide core piece having opposite first and second end surfaces,
    said first end surface of said core piece in contact with a predetermined one of said tungsten carbide mold cavity pieces when the mold is closed,
    said second end surface of said core piece in contact with a first one of said first set of said support elements when the mold is closed,
    said predetermined one of said mold cavity pieces in contact with a second one of said first set of said support elements when the mold is closed,
    said core piece being outsize in the axial direction by approximately one mil (0.001 inches) to provide impact when closing the mold between said core and predetermined cavity pieces and said first and second ones of said first set of support elements prior to contact between any other of said mold cavity pieces.

4. The improvement of claim 2 adapted for the molding of an article having a through-opening requiring a core piece further comprising:
    a tungsten carbide core piece having opposite first and second end surfaces,
    said first end surface of said core piece in contact with a predetermined one of said tungsten carbide mold cavity pieces when the mold is closed,
    said second end surface of said core piece in contact with a first one of said first set of said support elements when the mold is closed,
    said predetermined one of said mold cavity pieces in contact with a second one of said first set of said support elements when the mold is closed,
    said core piece being outsize in the axial direction by approximately one mil (0.001 inches) to provide impact when closing the mold between said core and predetermined cavitypieces and said first and second ones of said first set of support elements prior to contact between any other of said mold cavity pieces.

5. The improvement of claim 2 further comprising:
    a tungsten carbide upper cavity piece having a recess defining a portion of the thickness of the upper flange of the bobbin to be molded,
    said side pieces each having an upper recess defining the remainder of the thickness of the upper flange of the bobbin to be molded,
    whereby said recess of said upper cavity piece will retain the bobbin being molded in position when said side pieces are moved outwardly.

6. The improvement of claim 4 further comprising:
    a tungsten carbide upper cavity piece having a recess defining a portion of the thickness of the upper flange of the bobbin to be molded,
    said side pieces each having an upper recess defining the remainder of the thickness of the upper flange of the bobbin to be molded,
    whereby said recess of said upper cavity piece will retain the bobbin being molded in position when said side pieces are moved outwardly.

7. The improvement of claim 1 further comprising:
    support-ejector pins positioned to abut against the under side of the runners created during molding, and lost motion means to maintain said pins protracted against the runners during a pre-determined travel of the mold base on initial opening of the mold.

8. The improvement of claim 3 further comprising:
support-ejector pins positioned to abut against the under side of the runners created during molding, and
lost motion means to maintain said pins protracted against the runners during a pre-determined travel of the mold base on initial opening of the mold.

9. The improvement of claim 2 further comprising:
support-ejector pins positioned to abut against the under side of the runners created during molding,
lost motion means to maintain said pins protracted against the runners during a pre-determined travel of the mold base on initial opening of the mold, and
said pins and lost motion means being below the parting line.

10. The improvement of claim 4 further comprising:
support-ejector pins positioned to abut against the under side of the runners created during molding,
lost motion means to maintain said pins protracted against the runners during a pre-determined travel of the mold base on initial opening of the mold, and
said pins and lost motion means being below the parting line.

11. The improvement of claim 5 further comprising:
support-ejector pins positioned to abut against the under side of the runners created during molding,
lost motion means to maintain said pins protracted against the runners during a pre-determined travel of the mold base on initial opening of the mold, and
said pins and lost motion means being below the parting line.

12. The improvement of claim 6 further comprising:
support-ejector pins positioned to abut against the under side of the runners created during molding,
lost motion means to maintain said pins protracted against the runners during a pre-determined travel of the mold base on initial openings of the mold, and
said pins and lost motion means being below the parting line.

13. The improvement of claim 1 wherein:
The volume of a first one of said first set of support elements is substantially greater than the volume of the one of said mold cavity pieces in contact with said first one of said support elements.

14. The improvement of claim 2 wherein:
The volume of a first one of said first set of support elements is substantially greater than the volume of the one of said mold cavity pieces in contact with said first one of said support elements.

15. The improvement of claim 3 wherein:
The volume of said second one of said first set of support elements is substantially greater than the volume of the one of said mold cavity pieces in contact with said second one of said support elements.

16. The improvement of claim 4 wherein:
The volume of said second one of said first set of support elements is substantially greater than the volume of the one of said mold cavity pieces in contact with said second one of said support elements.

17. The improvement of claim 5 wherein:
The volume of a first one of said first set of support elements is substantially greater than the the volume of the one of said mold cavity pieces in contact with said first one of said support elements.

18. The improvement of claim 6 wherein:
The volume of said second one of said first set of support elements is substantially greater than the volume of the one of said mold cavity pieces in contact with said second one of said support elements.

19. The improvement of claim 7 wherein:
The volume of a first one of said first set of support elements is substantially greater than the volume of the one of said mold cavity pieces in contact with said first one of said support elements.

20. The improvement of claim 10 wherein:
The volume of said second one of said first set of support elements is substantially greater than the volume of the one of said mold cavity pieces in contact with said second one of said support elements.

21. The improvement of claim 12 wherein:
the volume of said second one of said first set of support elements is substantially greater than the volume of the one of said mold cavity pieces in contact with said second one of said support elements.

22. The improvement of claim 1 wherein:
said support elements have a coefficient of thermal expansion greater than that of said tungsten carbide mold cavity pieces.

23. The improvement of claim 2 wherein:
said support elements have a coefficient of thermal expansion greater than that of said tungsten carbide mold cavity pieces.

24. The improvement of claim 3 wherein:
said support elements have a coefficient of thermal expansion greater than that of said tungsten carbide mold cavity pieces.

25. The improvement of claim 5 wherein:
said support elements have a coefficient of thermal expansion greater than that of said tungsten carbide mold cavity pieces.

26. The improvement of claim 7 wherein:
said support elements have a coefficient of thermal expansion greater than that of said tungsten carbide mold cavity pieces.

27. The improvement of claim 10 wherein:
said support elements have a coefficient of thermal expansion greater than that of said tungsten carbide mold cavity pieces.

28. The improvement of claim 21 wherein:
said support elements have a coefficient of thermal expansion greater than that of said tungsten carbide mold cavity pieces.

* * * * *